US010376900B2

(12) United States Patent
Lombardo et al.

(10) Patent No.: US 10,376,900 B2
(45) Date of Patent: Aug. 13, 2019

(54) ELECTROSTATIC REMOVAL OF COLLOIDAL, SOLUBLE AND INSOLUBLE MATERIALS FROM A FLUID

(71) Applicant: KX Techologies LLC, West Haven, CT (US)

(72) Inventors: Andrew Lombardo, West Haven, CT (US); Rezan Kareem, Bridgeport, CT (US)

(73) Assignee: KX Technologies LLC, West Haven, CT (US)

( * ) Notice: Subject to any disclaimer, the term of this patent is extended or adjusted under 35 U.S.C. 154(b) by 322 days.

(21) Appl. No.: 15/167,294

(22) Filed: May 27, 2016

(65) Prior Publication Data

US 2016/0318039 A1 Nov. 3, 2016

Related U.S. Application Data

(63) Continuation of application No. 14/069,997, filed on Nov. 1, 2013, now abandoned.

(51) Int. Cl.
| | |
|---|---|
| *C02F 1/28* | (2006.01) |
| *C02F 1/42* | (2006.01) |
| *B03C 5/02* | (2006.01) |
| *B01D 39/16* | (2006.01) |
| *B01D 39/04* | (2006.01) |

(Continued)

(52) U.S. Cl.
CPC ............... *B03C 5/02* (2013.01); *B01D 39/04* (2013.01); *B01D 39/06* (2013.01); *B01D 39/1615* (2013.01); *B01D 39/1623* (2013.01); *B01D 39/1638* (2013.01); *C02F 1/283* (2013.01); *C02F 1/285* (2013.01); *C02F 1/288* (2013.01); *C02F 1/42* (2013.01);
(Continued)

(58) Field of Classification Search
CPC ........ C02F 1/285; C02F 1/288; C02F 1/4696; C02F 2101/20; C02F 1/283; C02F 1/42; C02F 2303/04; B03C 5/02; B01D 39/06; B01D 39/04; B01D 39/1615; B01D 39/391638; B01D 39/1623; B01D 2239/0435
See application file for complete search history.

(56) References Cited

U.S. PATENT DOCUMENTS

| | | | |
|---|---|---|---|
| 4,190,532 | A | 2/1980 | Halbfoster |
| 4,902,427 | A | 2/1990 | Szczepanik |

(Continued)

FOREIGN PATENT DOCUMENTS

EP    0815788 A2    1/1998

*Primary Examiner* — Matthew O Savage
(74) *Attorney, Agent, or Firm* — DeLio Peterson & Curcio LLC; Robert Curcio

(57) ABSTRACT

A filter that contains an adsorbent to remove the soluble portion of the contaminant, and then some form of electrostatic attraction additive. The electrostatic attraction additive would serve to pull the colloidal and particulate portion of the contaminant out of fluid, which could be held indefinitely, or be used to hold while the contaminant is allowed to solubilize and then be removed by the adsorbent. The electrostatic attraction additive could either be positively or negatively charged depending on the surface charge of the particulates that are in the fluid, and includes particles or fibers charged with charged polymers, zeolites, cation or anion exchange resin, powdered alumina, or nano-alumina.

2 Claims, 7 Drawing Sheets

(51) Int. Cl.
  *B01D 39/06*  (2006.01)
  *C02F 101/20*  (2006.01)

(52) U.S. Cl.
  CPC .. *B01D 2239/0435* (2013.01); *C02F 2101/20* (2013.01); *C02F 2303/04* (2013.01)

(56) References Cited

U.S. PATENT DOCUMENTS

| | | |
|---|---|---|
| 6,482,252 B1 | 11/2002 | Conrad |
| 6,872,311 B2 | 3/2005 | Koslow |
| 6,998,058 B2 | 2/2006 | Koslow |
| 7,179,314 B2 | 2/2007 | Conrad |
| 8,002,990 B2 | 8/2011 | Shroeder et al. |
| 8,252,098 B2 | 8/2012 | Mayer et al. |
| 2004/0178142 A1* | 9/2004 | Koslow ............... A61L 2/0017 210/500.29 |
| 2008/0023405 A1* | 1/2008 | Rawson ................ C02F 1/28 210/688 |
| 2009/0176052 A1 | 7/2009 | Childs et al. |
| 2009/0188870 A1* | 7/2009 | Schroeder ............ B01D 15/00 210/663 |
| 2010/0006508 A1* | 1/2010 | Mitchell ............... C02F 1/003 210/669 |
| 2010/0176044 A1 | 7/2010 | Domb et al. |
| 2011/0210062 A1 | 9/2011 | Wang et al. |
| 2014/0001123 A1 | 1/2014 | Kaledin et al. |

\* cited by examiner

| Test Type: | High pH Lead | | | | | | | | | | |
|---|---|---|---|---|---|---|---|---|---|---|---|
| Test Position: | [Untreated CSFO] 1 layer soaked in RODI for 15 min | | | | | | | | | | |
| D-471 | | | | | | | | | | | |
| Fil # | ml per fil | Total Volume (Gal) | Time (s) | Flow Rate mL/s | Influent Total (ppb) | Influent T1.2 (ppb) | Influent T0.1 (ppb) | Influent Soluble (ppb) | Influent Insoluble (ppb) | Effluent (ppb) | % Red | % Particle | % Fines |
| 1 | 1240 | 0.26 | 527 | 2.4 | 141.0 | 137 | 105.0 | 105.0 | 36.0 | 30.50 | 78.4% | 26% | 89% |
| 5 | 1283 | 1.32 | 740 | 1.7 | 141.0 | 137 | 105.0 | 105.0 | 36.0 | 31.21 | 77.9% | 26% | 89% |
| 10 | 1280 | 2.64 | 577 | 2.2 | 135.0 | 127.9 | 95.7 | 95.7 | 39.3 | 27.24 | 79.8% | 29% | 82% |

| Test Type: | High pH Lead | | | | | | | | | | |
|---|---|---|---|---|---|---|---|---|---|---|---|
| Test Position: | [Treated CSFO] 1 layer soaked in RO DI for 15 min | | | | | | | | | | |
| D-471A | | | | | | | | | | | |
| Fil # | ml per fil | Total Volume (Gal) | Time (s) | Flow Rate mL/s | Influent Total (ppb) | Influent T1.2 (ppb) | Influent T0.1 (ppb) | Influent Soluble (ppb) | Influent Insoluble (ppb) | Effluent (ppb) | % Red | % Particle | % Fines |
| 1 | 1320 | 0.26 | 1077 | 1.2 | 141.0 | 137 | 105.0 | 105.0 | 36.0 | 0.65 | 99.5% | 26% | 89% |
| 4 | 1320 | 1.06 | 1047 | 1.3 | 141.0 | 137 | 105.0 | 105.0 | 36.0 | 1.64 | 98.8% | 26% | 89% |
| 10 | 1320 | 2.64 | 841 | 1.6 | 135.0 | 127.9 | 95.7 | 95.7 | 39.3 | 6.28 | 95.3% | 29% | 82% |

FIG. 4

ELECTROSTATIC REMOVAL OF COLLOIDAL, SOLUBLE AND INSOLUBLE MATERIALS FROM A FLUID

BACKGROUND OF THE INVENTION

1. Field of the Invention

The present invention relates to a filter for removing colloidal, soluble, and insoluble materials from a fluid using an adsorbent to remove the soluble portion of the contaminant, and the addition of an electrostatic attraction additive to extract the colloidal and particulate portion of the contaminant out of the fluid, which could be held indefinitely, or at least while the contaminant is allowed to solubilize, at which point it is then removed by the adsorbent.

2. Description of Related Art

Certain water treatment applications are characterized by the need to remove both dissolved and suspended or colloidal materials. Although it has been used in numerous consumer products, toxic metals, such as lead, is known to be harmful to human health if inhaled or ingested. Important sources of toxic metal exposure include: ambient air, soil and dust (both inside and outside the home), food (which can be contaminated by toxic metals in the air or in food containers), and water (from the corrosion of plumbing). Materials such as ion exchange resins and reverse osmosis membranes effectively reduce or fully remove dissolved ionic species.

Particulate lead at high pH exists primarily as colloidal lead carbonates. These colloidal particulate solids can be physically removed if the filter media provides for a fine enough mesh that can also accommodate pressure differentials.

It is known to separate particles, such as dirt and dust particles from a fluid flow using mechanical filters, such as foam filters, cyclonic separators, and electrostatic separators where dust particles are charged and then attracted to another oppositely charged surface for collection. This is the common use of electrostatic filters.

Known electrostatic filters include factional electrostatic filters and electret medium filters. Examples of such filters are described in EP 0815788, U.S. Pat. Nos. 7,179,314, and 6,482,252.

Electrostatic filters are commonly used for air filtration. In typical electrostatic filter operation, a safe static charge is produced by forcing air across the filter. This static charge attracts and traps airborne particles into the filter. Electrostatic air filters generally work by sieving materials via fibers that are designed such that when air flows through them they acquire static charges. Other fibers acquire negative charges and the charges draw materials in a similar fashion as being drawn by magnets. Afterwards, filtration takes place leaving the materials on the surface of the filter.

In an alternative embodiment to mechanical filters for fine particle filtration of fluids, including dielectric fluids, fluid is made to pass through a number of electrodes which are alternately charged with relatively high positive and negative voltages. Porous filter material is placed between the electrodes for trapping the particulates. Particulates, when subjected to the electric fields created by the application of voltage to the electrodes, are filtered in one of two possible ways. The filter material itself may be charged with the particulates being attracted to the filter material itself. More likely, however, the particulates are charged, either positively or negatively, depending on their composition, and the oppositely charged particles will be attracted to each other and eventually form larger particulate clusters which will be large enough to be trapped in the filter material. Whenever enough clusters form to effectively block the filter, or produce an undesirable pressure drop, the filter must be replaced.

Although electrostatic filters have been known in the art for some time for air filtration, there remains a need in the art for improved filtration regarding the removal of soluble and colloidal, non-soluble particles in a fluid, and untested at present, electrostatic filters may play a role in this removal.

SUMMARY OF THE INVENTION

Bearing in mind the problems and deficiencies of the prior art, it is therefore an object of the present invention to provide a filter for removing soluble, colloidal, and insoluble particles from a fluid.

It is another object of the present invention to provide a filter for removing soluble, colloidal, and insoluble material in a high pH fluid environment using electrostatic attraction forces.

It is yet another object of the present invention to provide a filter for removing soluble, colloidal, and insoluble material in a high pH fluid environment using fibrillated nanofibers as one of the filter media and electrostatic attraction forces.

It is another object of the present invention to provide a filter for removing soluble, colloidal, and insoluble lead from a fluid treated to drinking water specifications using multiple filter media where at least one filter media includes an electrostatic attraction additive.

The above and other objects, which will be apparent to those skilled in the art, are achieved in the present invention which is directed to a filter for removing soluble, colloidal, and insoluble material from a fluid comprising: a container for receiving ingress fluid, and for securing and introducing filter media to the fluid; a treated filter media for filtering soluble material from the fluid, the treated filter media including an electrostatic attraction additive, such that the colloidal particles are retained through electrostatic attraction within the treated filter media until becoming soluble in the fluid, and subsequently passing through the remainder of the filter media, thereby being removed by the filter media.

The electrostatic attraction additive may include particles or fibers charged with charged polymers, zeolites, cation or anion exchange resin, powdered alumina, or nano-alumina, or any combination thereof.

In one embodiment, the electrostatic attraction additive may include charged fibers or charged carbon or other charged particles with polyDADMAC.

A sufficient amount of the electrostatic attraction additive necessary to remove charged colloidal material is analytically derived from a combination of a charge on the treated filter media material, a charge of the colloidal material, a mass of the colloidal material being removed, a pore size of the treated filter media, and a flow rate or face velocity of the colloidal material through the treated filter media.

The filter of claim 1 including having fibrillated nanofibers as one of the filter media. The fibrillated nanofibers may comprise cellulose or acrylic compositions. The fibrillated nanofibers may also be fabricated into at least one pleated sheet of filter material.

In a second aspect, the present invention is directed to a filter for removing soluble, colloidal, and insoluble material from a fluid comprising: a container for receiving ingress fluid, and for securing and introducing filter media to the fluid; a first treated filter media, treated with an electrostatic attraction additive for capturing the colloidal material; a second filter media in fluid communication with the first treated filter media, for filtering the soluble material from the fluid and from soluble colloidal material initially electrostatically trapped by the first treated filter media.

In a third aspect, the present invention is directed to a filter for removing soluble, colloidal, and insoluble material from a fluid comprising: a container for receiving ingress fluid, and for securing and introducing filter media to the fluid; a first treated filter media, treated with an electrostatic attraction additive for capturing the colloidal material; a second filter media in fluid communication with the first treated filter media, for filtering the soluble material from the fluid and from soluble colloidal material initially electrostatically trapped by the first treated filter media; and a third filter media adjacent to, and in fluid communication with, the second filter media wherein the second and third filter media create a physical barrier for the colloidal material at their interface for capturing the colloidal particles; the colloidal particles being retained by the first treated filter media through electrostatic attraction, and retained at the interface until becoming soluble in the fluid, subsequently passing through the interface, and being removed by the second or third filter media, or both second and third filter media. In a fourth aspect, the present invention is directed to a filter for removing soluble, colloidal, and insoluble material from a fluid comprising a first filter layer and a second filter layer separated by an electrostatic attraction additive layer. The filter media layers are designed in tandem to predominantly to remove soluble lead from treated challenge water. When water passes through filter media layer, appreciable amounts of contaminants are removed, particularly soluble contaminants. Some insoluble and colloidal contaminants may be suspended in filter media; however, depending upon the looseness of the pore structure, most insoluble and colloidal contaminants will pass through to electrostatic attraction additive layer. The electrostatic attraction of the positive particulate lead contaminants (Pb+) stops the travel of particulate lead, and prohibits particulate lead from passing through to filtration media. The particulate or colloidal lead is trapped within electrostatic attraction additive layer. The predisposition of particulate or colloidal lead is ultimately to transform into soluble solution through absorption. Consequently, the treated challenge water becomes soluble with lead by solubilizing the colloidal lead until all of the particulate lead trapped within electrostatic attraction additive layer 34 is absorbed into the treated challenge water. Once absorbed into the treated challenged water, the particulate lead is removed by filtration media.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 4 depicts two tables, Table I and Table II, where Table I represents the filtration results of high pH lead treated water, formulated pursuant to the NSF pH 8.5 protocol, which includes both soluble lead and particulate lead, and Table II represents filtration results of high pH lead treated water through a treated CSF0 filter media layer soaked in RODI water;

DESCRIPTION OF THE PREFERRED EMBODIMENT(S)

In describing the preferred embodiment of the present invention, reference will be made herein to FIGS. 1-6 of the drawings in which like numerals refer to like features of the invention.

The present invention teaches a filter that contains an adsorbent to remove the soluble portion of a contaminant in the form of electrostatic attraction additive. The electrostatic attraction additive serves to pull the colloidal and particulate portion of the contaminant out of fluid, which could be held indefinitely, or be used to hold while the contaminant is allowed to solubilize and then be removed by the adsorbent. The electrostatic attraction additive could either be positive or negatively charged depending on the surface charge of the particulates that are in the fluid. The electrostatic attraction additive could be, but is not limited to, particles or fibers charged with charged polymers, zeolites, cation or anion exchange resin, powdered alumina, nano alumina, and the like.

In the prior art, the solution to the problem is being taken care of either by extending the contact time greatly, or using a mixture of size exclusion, and soluble adsorbents. However, the size exclusion can severely limit the pore area as well as the flow rate of a filter depending on the size of the particulates trying to be removed. Utilizing an electrostatic filtering technique in combination with other filter media would allow for more open pore structures in the filters as the particulates would be removed by the electrostatic attraction and not pore size.

The requirements for the removal of colloidal lead are dictated in part by a recent aggressive NSF lead protocol, which requires the removal of lead in low pH treated challenge water, as well as high pH treated challenge water. Although the NSF/ANSI protocol is a governing procedure in the industry for contaminant removal in drinking water, it is not the only procedure, and the present invention can be adjusted to accommodate other contaminant removal protocols that may be different or more or less stringent than the NSF/ANSI standard.

In the governing NSF test, about 100 parts-per-billion (ppb) of soluble lead is introduced in treated challenge water. Another 50 parts per billion are added as insoluble lead. The lead particle sizes are on the order of 0.1 to 1.2 microns. Generally, particles on the order of 1 micron or less will remain in suspension.

Figure 1:
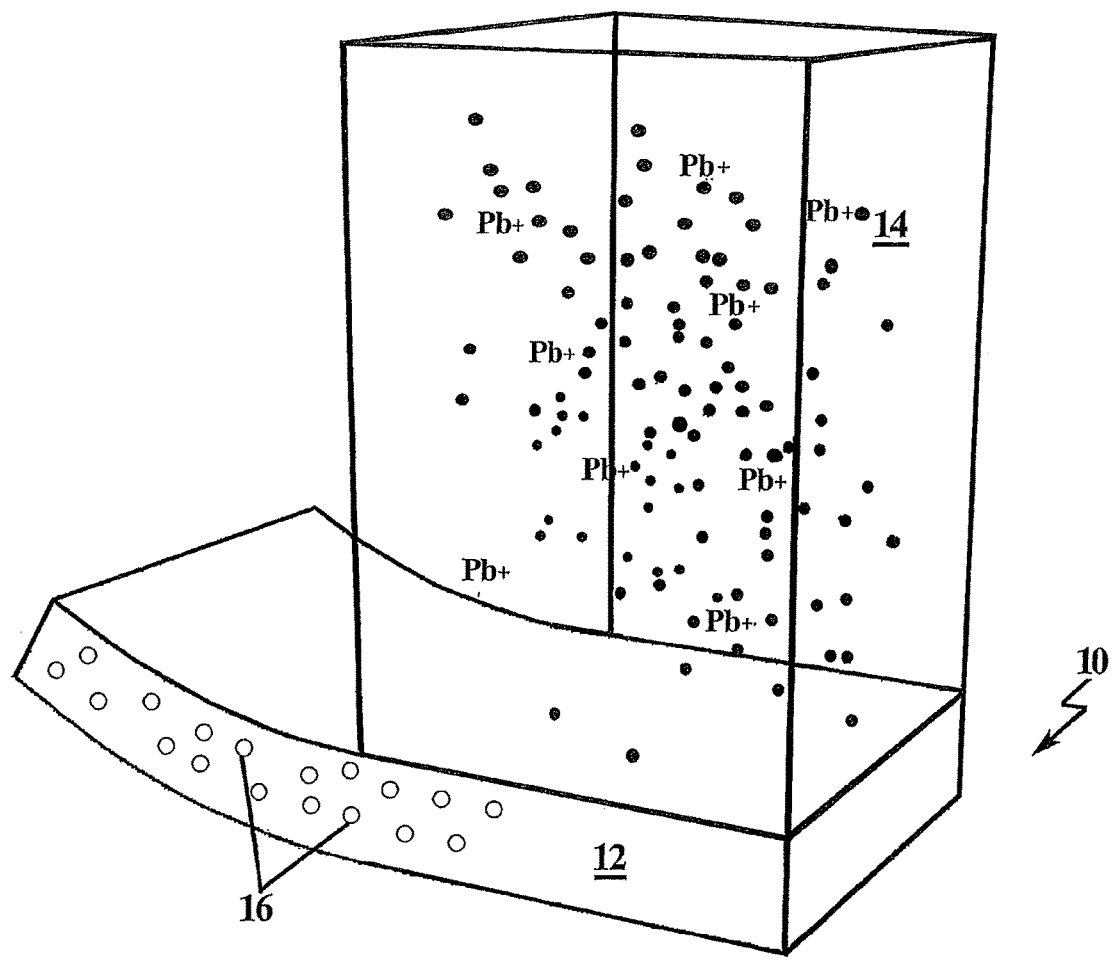
FIG. 1 is a cross-sectional view of treated filter media of the present invention for removing soluble and colloidal material from a fluid.

In one embodiment, as shown in FIG. 1, a filter 10 comprising a filter media 12 is introduced to treat challenged water 14. In this example, the treated challenged water 14 includes colloidal, soluble, and insoluble charged lead particles (Pb+), and the invention is capable of accommodating other types of charged particle contaminants. Filter media 12 is typically of a pleated fabrication, although other filter media configurations are not precluded. Filter media 12 generally incorporates a microporous structure that provides colloidal interception capability using an appropriate pore structure, charge material, chemical treatment, or a combination thereof. The microporous structure may comprise an array of active particles that have a specific pore structure, as well as adsorbent and/or absorbent properties. The array can be a solid composite block, a monolith, a ceramic candle, or a flat-sheet composite of bonded or immobilized particles formed into a coherent medium, all of which may use a binder or supporting bonding material. These particle arrays may be made through processes known in the art such as, for example, extrusion, molding, or slip casting. Flat sheet composites can be made through processes known in the art such as, for example, papermaking processes, melt blown processes, air laid process, or woven processes. For desirable results, the microporous material is capable of having a mean flow path on the order of 2 microns, although having a particular mean flow path is not a condition precedent for practicing the present invention.

Fibers may also be used as the core filter media. These fibers may comprise organic polymeric fibers that are capable of being fibrillated. Fibrillated fibers are generally advantageous due to their exceptionally fine dimensions and potentially low cost. Such fibrillated fibers include, but are not limited to, polymers such as polyamide, acrylic, acrylonitrile; liquid crystal polymers such as VECTRAN® from Kuraray Co., Ltd., of Japan, and ZYLON® from Toyo Boseki Kabushiki Kaisha Corporation of Japan, and the like, ion-exchange resins, engineered resins, cellulose, rayon, ramie, wool, silk, glass, metal, ceramic, other fibrous materials, or combinations thereof, or a combination of fibers with particulate media such as, but not limited to, activated carbon, activated alumina, zeolites, diatomaceous earth, silicates, aluminosilicates, titanates, bone char, calcium hydroxyapatite, manganese oxides, iron oxides, magnesia, perlite, talc, polymeric particulates, clay, iodated resins, ion exchange resins, ceramics, super absorbent polymers (SAPs), and combinations thereof. Combinations of organic and inorganic fibers and/or whiskers, whether fibrillated or not, are contemplated and within the scope of the invention. For example, glass, ceramic, metal fibers, or polymeric fibers may be used separately or together. In one embodiment, fibrillated lyocell fibers, such as LYOCELL BY LENZING® from Lenzing Aktiengesellschaft Corporation of Austria, are employed due to their exceptionally fine dimensions and potentially low cost.

The core filter media may also be in the form of a flat sheet media, potentially made from fibers, or combinations of fibers and particulate media, which may ultimately be rolled, layered, and/or pleated for enhanced filtering applications. The sheets, in turn, may be layered, wrapped, or fabricated into flow-through forms. The pleated membranes may be utilized as made or further fabricated into cartridge filters alone or in combination with other materials.

The charged or cationic material may be a colloid, a small charged molecule, or a linear or branched polymer having positively charged atoms along the length of the polymer chain having a counter ion associated therewith.

If the cationic material is a polymer, the charge density may be greater than about 1 charged atom per about every 20 Angstroms, specifically greater than about 1 charged atom per about every 12 Angstroms, and more specifically greater than about 1 charged atom per about every 10 Angstroms of molecular length. The cationic material consistently provides a highly positively charged surface to the microporous structure as determined by a streaming or zeta potential analyzer, whether in a high or low pH environment. Zeta or streaming potentials of the microporous structure after treatment with a high molecular weight charged polymer are generally greater than about +6 millivolts, and often up to about +23 millivolts at a range of pH levels.

The cationic material generally suitable for use includes, but is not limited to, quaternized amines, quaternized amides, quaternary ammonium salts, quaternized imides, benzalkonium compounds, biguanides, cationic aminosilicon compounds, cationic cellulose derivatives, cationic starches, quaternized polyglycol amine condensates, quaternized collagen polypeptides, cationic chitin derivatives, cationic guar gum, colloids such as cationic melamine-formaldehyde acid colloids, inorganic treated silica colloids, polyamide-epichlorohydrin resin, alumina, activated alumina, nanoalumina cationic acrylamides, polymers and copolymers thereof, combinations thereof, and the like.

The unique structure of fibrillated fibers allow much higher loading of these water treatment materials than can be achieved with current technology. The loading materials include, but are not limited to, synthetic organic and inorganic ion exchangers, zeolites, carbon, adsorbents, and metal oxides, such as titanium oxide, metal hydroxides, and other filter aids. In inorganic ion exchangers, cation charges are swapped out for particulates in water, and in the ion exchange, the positive charge of, for example, a sodium ion pulls out the cations, which is distinctly different than electrostatic absorption.

These materials are generally capable of removing contaminants from the treated, challenged water; however, they are not well suited for certain colloidal, soluble, and insoluble contaminants since the contact time remains limited, especially in gravity flow applications. In order to achieve sufficient contact time for captured colloidal and soluble contaminants, an additive 16 having electrostatic properties is combined with filter media 12. The electrostatic attraction additive would serve to pull the colloidal and particulate portion of the contaminant out of fluid.

The fundamental law of electrostatics is that the force between two charged particles is directly proportional to the product of their charges and inversely proportional to the square of the distance between them.

The fundamental equation of electrostatics is Coulomb's law, which describes the force between two point charges. The magnitude of the electrostatic force (in Newtons) between point charges $Q_1$ and $Q_2$ (in coulombs) is directly proportional to the product of the magnitudes of each charge and inversely proportional to the surface area of a sphere whose radius is equal to the distance (in meters) between the charges:

$$F = \frac{Q_1 Q_2}{4\pi r^2 \varepsilon_0}$$

where, $\varepsilon_0$ is the permittivity of free space, $1/[\mu_0 c_o^2]=8.854187871\ (10^{-12})$.

By the physics of electrostatic charges, the colloidal and particulate portion of the contaminant may be electrostatically bound within the filter media indefinitely, or held until the contaminant is allowed to solubilize and then be removed by the adsorbent.

Figure 2:
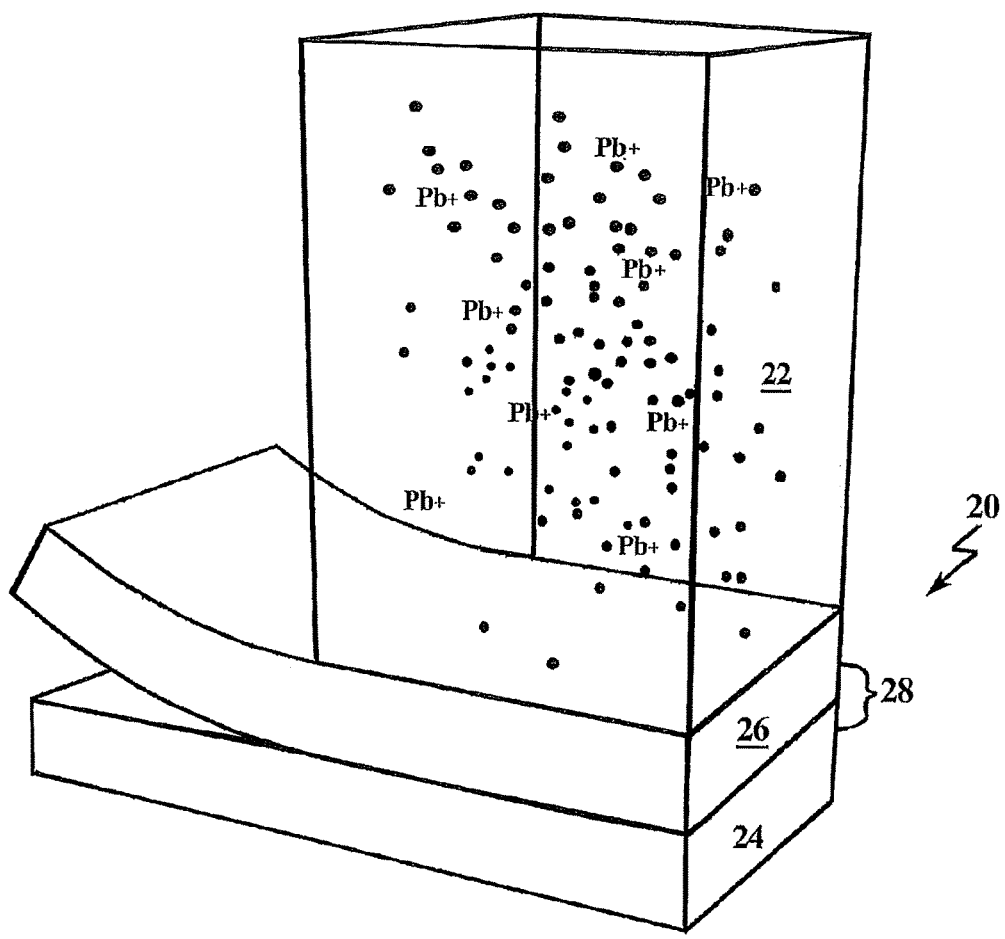
FIG. 2 is a cross-sectional view of a two layered filter media, one layer employing an electrostatic attraction additive, and a second layer forming a carbon or fiber based filter media without an electrostatic attraction additive.

As stated previously, the electrostatic attraction additive could either be positive or negatively charged depending on the surface charge of the particulates that are in the fluid. The electrostatic attraction additive could be, but is not limited to, particles or fibers charged with charged polymers, zeolites, cation or anion exchange resin, powdered alumina, nano-alumina, and the like. The electrostatic attraction additive may be combined with filter media, or added as a separate layer as depicted in FIG. 2. The electrostatic attraction additive may be added to fibers by charging the fibers or carbon filter core with a polymer, such as polyDADMAC or other additives.

Referring to FIG. 2, again using a gravity flow model as an illustrative example, although the present invention is not to be so limited, filter 20 is exposed to treated challenge water 22 meeting the NSF requirements. Treated challenged water 22 flows into filter media 24 along with an electrostatic attraction additive layer 26.

In this configuration it is further possible to combine physical barrier attributes of the prior art, although not a prerequisite for the implementation of the present invention, that is, allowing the interface region 28 between filter media 24 and electrostatic attraction additive layer 26 provide a physical barrier to insoluble, colloidal, and soluble lead, thereby further retaining the non-dissolved contaminants at the barrier interface until such time as the contaminants may become soluble and filtered by filter media 24. This barrier would be in addition to, and in conjunction with, the suspension of the contaminants by the electrostatic attractive additive of layer 26.

Conversely, in the current embodiment, interface region 28 need not be the result of a physical barrier that impedes filtration; rather, an advantage of the present invention is that no such barrier is necessitated—and unwanted pressure drops are not realized. This is because the present invention allows for more open pore structures in the filters, with the particulates being removed by electrostatic attraction and not pore size.

Figure 3A:
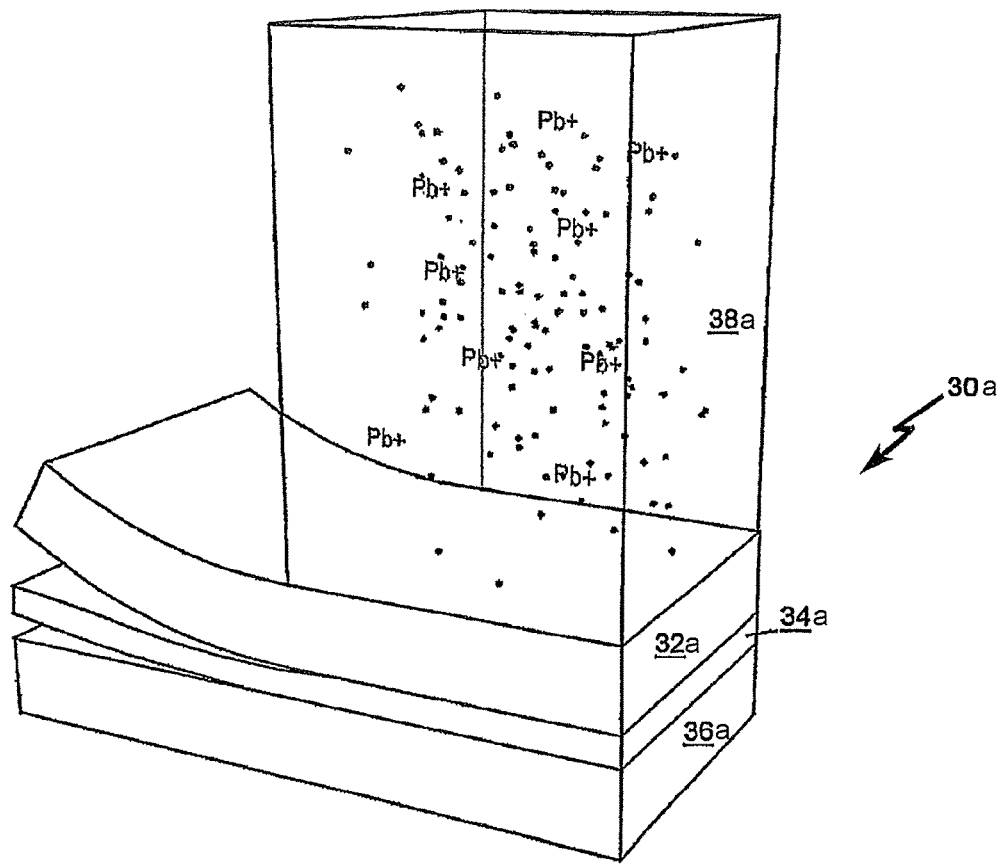
FIG. 3a is a cross-sectional view of a multilayer filter media depicting a first layer of filter media including an electrostatic additive and a second filter layer of filter media and a third layer of filter media defining a physical barrier at their interface.
Figure 3B:
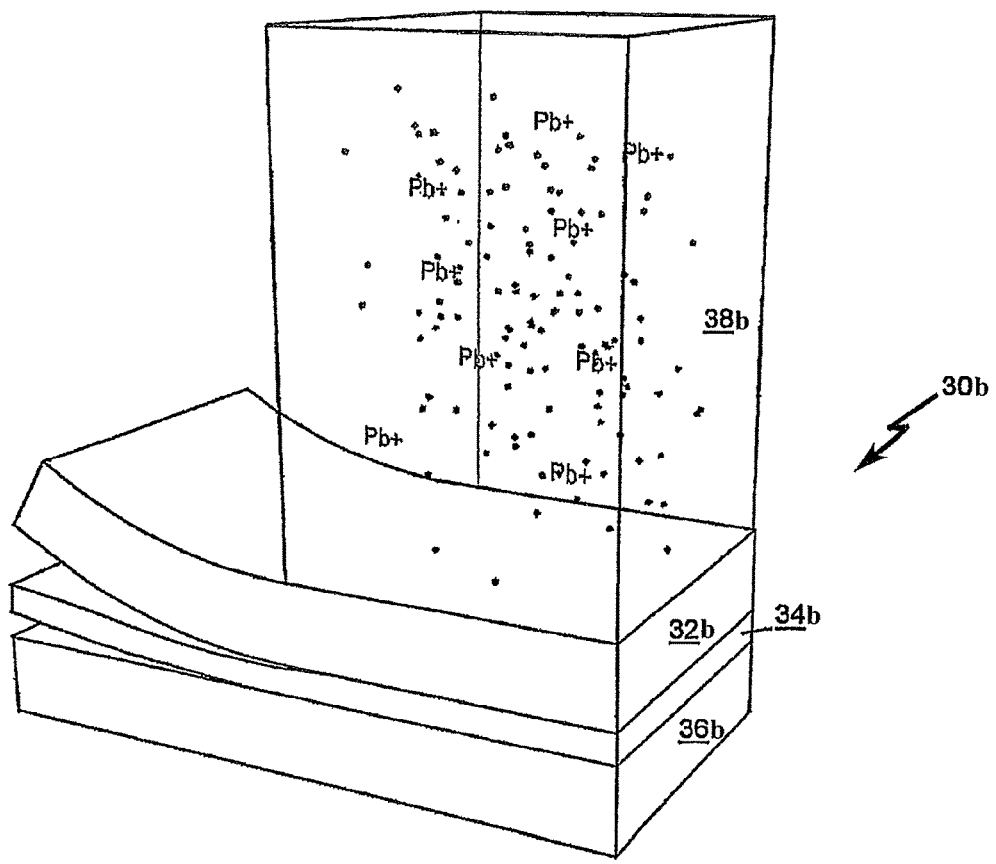
FIG. 3b is a cross-sectional view of a multilayer filter media depicting a first filter layer and a second filter layer separated by an electrostatic attraction additive layer, where the filter media layers are designed in tandem to remove soluble lead from treated challenge water.

In the third aspect of the invention shown FIG. 3a, a multilayer filter media is presented depicting a first layer of filter media 32a including an electrostatic additive, and a second filter layer of filter media 34a and a third layer of filter media 36a defining a physical barrier at an interface. In the fourth aspect of the invention shown FIG. 3b, a multilayer filter media is presented depicting a first filter layer 32b and a second filter layer 36b separated by an electrostatic attraction additive layer 34b. The filter media layers are designed in tandem to predominantly to remove soluble lead from treated challenge water.

The third aspect of the invention includes a filter 30a shown FIG. 3a includes a container for receiving ingress water 38a, and for securing and introducing filter media to said water. The first layer of filter media 32a, includes fibrillated cellulose nanofibers treated with an electrostatic attraction additive including polyDADMAC for providing said fibers with a positive charge for capturing colloidal and insoluble lead particles. A second layer of filter media 34a containing a cation exchange material is located downstream of and adjacent to the first layer 32a of filter media, for filtering soluble lead from the water and soluble lead from soluble colloidal material lead initially electrostatically trapped by the first layer of filter media 32a. A third layer of filter media 36a containing a cation exchange material is located down stream of and adjacent to, and in fluid communication with, the second layer of filter media 34a, wherein the second and third layers of filter media create a physical barrier for the colloidal and insoluble lead particles at their interface for capturing the colloidal and insoluble lead particles. The colloidal and insoluble lead particles are retained by the first layer 32a of filter media through electrostatic attraction and are retained by the physical barrier at the interface between the second layer of filter media 34a and third layer of filter media 34b by size exclusion until becoming soluble in the water, soluble lead subsequently passing through the first layer 32a of filter media being removed by both said second and third layers of filter media, and soluble lead passing through said physical barrier being removed by the third layer of filter media 36a. In the fourth aspect of the invention includes a filter 30b shown in FIG. 3b, NSF treated challenge water 38b passes through filter media layer 32b, appreciable amounts of contaminants are removed, particularly soluble contaminants. Some insoluble and colloidal contaminants may be suspended in filter media 32b; however, depending upon the looseness of the pore structure, most insoluble and colloidal contaminants will pass electrostatic attraction additive layer 34b. The electrostatic attraction of the positive particulate lead contaminants (Pb+) stops the travel of particulate lead, and prohibits particulate lead from passing through to filtration media 36b. The particulate or colloidal lead is trapped within electrostatic attraction additive layer 34b. The predisposition of particulate or colloidal lead is ultimately to transform into soluble solution through absorption. Consequently, the treated challenge water becomes soluble with lead by solubilizing the colloidal lead until all of the particulate lead trapped within electrostatic attraction additive layer 34b is absorbed into the treated challenge water. Once absorbed into the treated challenged water, the particulate lead is removed by filtration media 36b.

In the closest prior art, U.S. Pat. No. 8,002,990 issued to Schroeder on Aug. 23, 2011, titled, "USES OF FIBRILLATED NANOFIBERS AND THE REMOVAL OF SOLUBLE, COLLOIDAL, AND INSOLUBLE PARTICLES FROM A FLUID," two filter media create a physical non-soluble particle barrier at their interface for capturing colloidal and non-soluble particles, that when retained at the interface, become soluble over time in the fluid, and are subsequently removed by the second filter media. This filter media construct forming a physical barrier for the non-soluble particles is not required in the present invention. The physical attributes at the interface between the filter layers are no longer governed by their ability to create a physical barrier. Rather, electrostatic attraction additive layer 34 attracts and holds the charged non-soluble particles until they become soluble over time. In the present invention, there is no need for a filter media to create a physical size exclusion barrier; that is, form a physical barrier for stopping non-soluble particles from flowing through the filter media.

Thus, in the present invention, filter media 12 of FIG. 1, filter media 26 of FIG. 2, and filter media 34 of FIG. 3, are non-physical filter media, insomuch as each is not chiefly designed to stop physical (colloidal) lead particles. Such filter media may be formed from impregnated paper, although other forms of filter media may be used provided the filter media is predominantly a soluble filter media.

The use of electrostatic attraction to hold onto particles and colloids as opposed to physical size exclusion may allow the use of larger pore diameters to be used, but still remove the small particles.

In order to achieve the necessary electrostatic attraction, it is desirable to have the zeta potential as high as possible for the treated filter media, and of an opposite charge of the contaminant material being removed. If it is desirable to remove a positively charged particle, then the treated filter media would need a negatively charged surface. For example, a treated filter media that is treated with polyDADMAC is targeting negatively charged particles. Thus, the polyDADMAC presents a positive surface charge. The amount of charge necessary to remove a particle is dependent on the diameter of the pore, the charge of the particle, the mass of the particle, and the flow rate. Analytically, an escape velocity is essentially determined, based on the aforementioned Coulomb's law.

Since the attraction force is essentially Mass times Acceleration ($F=ma$), the force is a scalar (mass)multiplied by the second derivative of position, and thus a function of time and position. If a particle is flowing through a pore at a certain flow rate, it has a certain time in the pore. Sufficient charge ($Q1$ of Coulomb's Law) at a specific pore size (the r in Coulombs law would be ½ the pore diameter and therefore force decreases as the pore size increases)), is required to remove a specific contaminant charged particle ($Q2$ of Coulomb's Law) to create enough force to pull the particle to the surface of the fiber or filter media "wall" before it escapes the pore with its forward velocity.

Consequently, assessing the required amount of electrostatic attraction additive requires a combination of the charge on the fiber, the charge of the particle, the mass of the particle that is being removed, length of the pore, the pore size of the filter media, and the flow rate or face velocity of the contaminant.

FIG. 4 depicts two tables, Table I and Table II. Table I represent the filtration results of high pH lead treated water, formulated pursuant to the NSF pH 8.5 protocol, which includes both soluble lead and particulate lead. The treated water is filtered through an untreated filter, media layer, having a Canadian Standard Freeness of zero (CSF0), soaked in reverse osmosis deionized (RODI) water. The filter media is untreated insomuch as it is not treated with an electrostatic attraction additive. Test results show a reduction of contaminants on the order of 77% to 79%. The results indicate that the untreated filter cannot remove all the lead from the water, in part because the filter media is not removing the particulate portion of the solution.

Table II represents filtration results of high pH lead treated water through a treated CSF0 filter media layer soaked in RODI water. The filter media is cellulose based media charged with polyDADMAC. The polyDADMAC establishes the electrostatic attraction forces sufficient to suspend the particulate lead. When the filter media is treated with the electrostatic attraction additive, the reduction in contaminants is on the order of 95% to 99%, significantly greater than the untreated test case.

Figure 5:
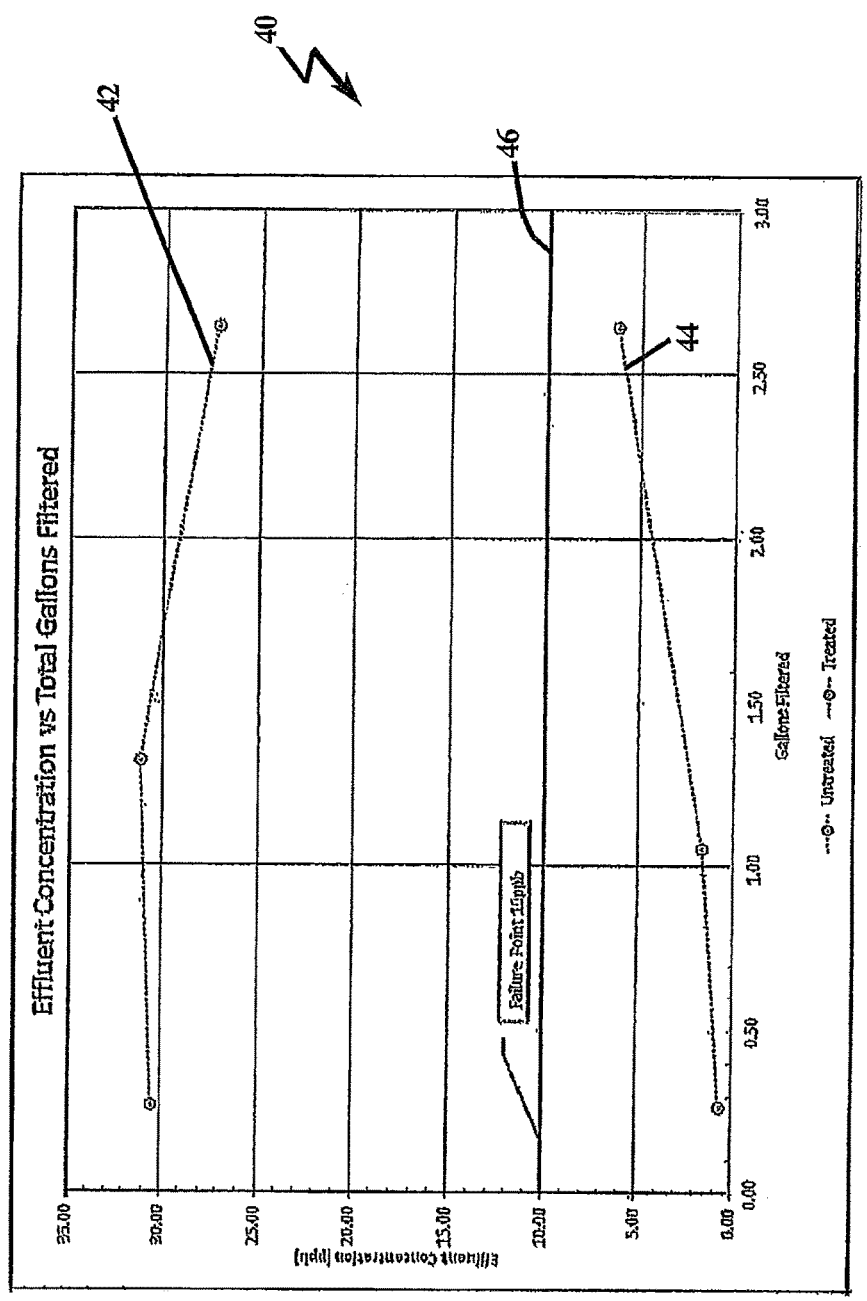
FIG. 5 depicts a graph of the effluent concentration against the total gallons filtered for the treated and untreated examples of FIG. 4.

FIG. 5 depicts a graph 40 of the effluent concentration against the total gallons filtered for the treated and untreated examples above. Effluent concentration of the untreated filter media, depicted by line 42, is substantially higher than the concentration resulting from the treated filter media, as represented by line 44. A failure point for the NSF test of 10 ppb is indicated by line 46.

Figure 6A:
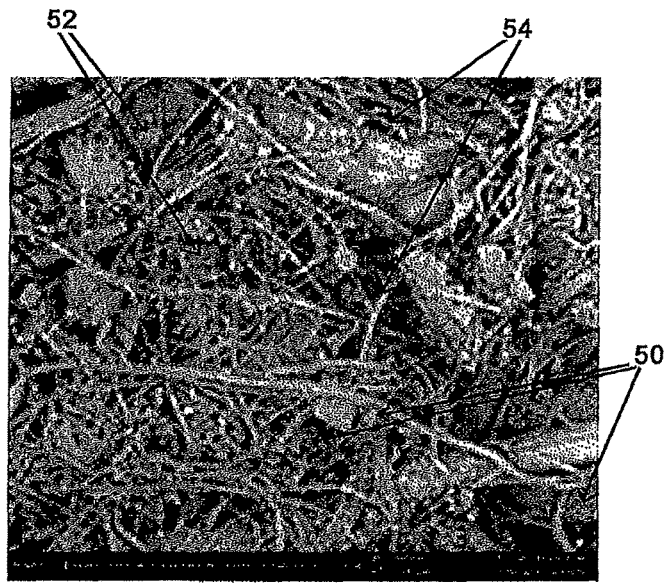
FIGS. 6A and 6B depict scanning electron microscope images of charged filter media of the present invention.
Figure 6B:

FIGS. 6A and 6B depict scanning electron microscope images of charged filter media of the present invention. A soluble heavy metal absorbent 50 is interspersed with carbon particles 52 and charged fibers 54. In these exemplary SEM images, the surfaces of the fiber in the filter media are charged positive.

The present invention provides for a filter that contains an adsorbent to remove the soluble portion of the contaminant, and then some form of electrostatic attraction additive. The electrostatic attraction additive would serve to pull the colloidal and particulate portion of the contaminant out of fluid, which could be held indefinitely, or be used to hold while the contaminant is allowed to solubilize and then be removed by the adsorbent. The electrostatic attraction additive could either be positively or negatively charged depending on the surface charge of the particulates that are in the fluid. The electrostatic attraction additive could be, but not limited to, particles or fibers charged with charged polymers, zeolites, cation or anion exchange resin, powdered alumina, nano alumina, and the like.

Utilizing this method would allow for more open pore structures in the filters as the particulates would be removed by the electrostatic attraction and not by pore size.

While the present invention has been particularly described, in conjunction with a specific preferred embodiment, it is evident that many alternatives, modifications and variations will be apparent to those skilled in the art in light of the foregoing description, it is therefore contemplated that the appended claims will embrace any such alternatives, modifications and variations as falling within the true scope and spirit of the present invention.

Thus, having described the invention, what is claimed is:

1. A filter for removing soluble, colloidal, and insoluble lead particles from water comprising:
    a container for receiving ingress water, and for securing and introducing filter media to said water;
    a first layer of filter media, including fibrillated cellulose nanofibers treated with an electrostatic attraction additive including polyDADMAC for providing said fibers with a positive charge for capturing said colloidal and insoluble lead particles;
    a second layer of filter media including a cation exchange material contained therein located downstream of and adjacent to said first layer of filter media, for filtering said soluble lead from said water and soluble lead from soluble colloidal material lead initially electrostatically trapped by said first layer of filter media; and
    a third layer of filter media including a cation exchange material contained therein located down stream of and adjacent to, and in fluid communication with, said second layer of filter media, wherein said second and third layers of filter media create a physical barrier for said colloidal and insoluble lead particles at their interface for capturing said colloidal and insoluble lead particles;
    said colloidal and insoluble lead particles being retained by said first layer of filter media through electrostatic attraction and being retained by said physical barrier through size exclusion until becoming soluble in said water, soluble lead subsequently passing through said first layer of filter media being removed by both said second and third layers of filter media, and soluble lead passing through said physical barrier at said interface being removed by said third layer of filter media.

2. A filter for removing soluble, colloidal, and insoluble lead particles from water comprising:
    a container for receiving ingress water, and for securing and introducing filter media to said water;

a first layer of filter media including a cation exchange material contained therein for filtering said soluble lead from said water;

a second layer of filter media located downstream of and adjacent to said first layer of filter media, said second layer of filter media including fibrillated cellulose nanofibers treated with an electrostatic attraction additive including polyDADMAC for providing said fibers with a positive charge for capturing said colloidal and insoluble lead particles; and a third layer of filter media including a cation exchange material contained therein located down stream of and adjacent to, and in fluid communication with, said second layer of filter media;

said colloidal and insoluble lead particles being retained by said second layer of filter media through electrostatic attraction until becoming soluble in said water, soluble lead subsequently passing through said second layer of filter media being removed by said third layer of filter media.

\* \* \* \* \*